Patented July 29, 1952

2,605,284

UNITED STATES PATENT OFFICE 2,605,284

PROCESS OF SEPARATING CRYSTALLINE AMINO ACIDS MIXTURES FROM NATURAL PROTEINS

Henry S. Hess, Los Angeles, Calif., assignor, by mesne assignments, to The Stuart Company, Pasadena, Calif., a corporation of California No Drawing. Application September 9, 1946, Serial No. 695,807

15 Claims. (Cl. 260—529)

1

This invention relates to amino acids, and more particularly to a process for quantitatively separating crystalline amino acids mixtures from natural proteins.

As is well known, natural proteins, such as casein, yeast, soy flour, wheat, corn, rice, and the like, are a plenteous source of amino acids, each of these proteins yielding substantially the same amino acids, approximately nineteen in number, in varying proportions upon hydrolysis. Out of this number of constituent amino acids, ten have been proven essential in the nitrogen metabolism process of the human body, and it has been shown that the absence of any one of these essential acids is detrimental to a particular phase of this process.

Natural proteins are commonly hydrolyzed by acid, alkali, or enzymatic hydrolysis, and the resulting protein hydrolysates are subsequently treated to produce a substantially saturated solution of amino acids or their salts in a polar solvent. Great difficulties are encountered at this stage in the attempt to separate a crystalline mixture of the acids, or salts thereof, from the solvent, since the amphoteric properties of the acids seem to interfere with the formation of crystals.

Each of the nineteen constituent amino acids has an iso-electric point at which optimum crystalline precipitation will occur from a saturated polar solvent. Since the iso-electric points for the nineteen constituent acids vary from a pH of approximately 3.2 to a pH of approximately 10.8, it is readily seen that at any chosen pH value within this range the acids having iso-electric points corresponding to this value will precipitate in desirable crystalline form upon further concentration of the solution, while those acids having iso-electric points varying from this pH value will precipitate in an undesirable amorphous or colloidal form.

When the attempt is made to concurrently precipitate the nineteen amino acids, derivable from a natural protein, from a polar solvent at a controlled pH value, the resultant end product is not crystalline in nature. As the concentration proceeds, a prevalently amorphous precipitate is obtained. Furthermore, the attempt to separate the acids of the mixture by controlling the pH value of the solution to successively correspond to iso-electric points of each of the constituents, and thus obtain a quantitative fractional separation, is thwarted, first, by the fact that the crystalline precipitate of any particular acid carries with it varying amounts of amorphous precipitates of the remaining acids, and, secondly, as the separation proceeds, the pH of the solution shifts rapidly so as to make any control of the pH value difficult.

2

As a consequence of the above-mentioned difficulties, the conventional practice of obtaining amino acids in usable form generally follows one of the following courses: The preparation synthetically of each of the pure essential amino acids, resulting in a market price sufficiently high to prohibit widespread general use; the selective liberation of amino acids from protein hydrolysates by such methods as the Fischer-Esterification method, the Dakin butyl alcohol method, the electrical transport method, and by fractionation with azeotropic solvent mixtures, each of which is extremely complicated and productive of an uneconomical yield; the mass precipitation of the amino acids or their salts form a protein hydrolysate, as heretofore described, resulting in a hygroscopic amorphous mixture which has a high degree of impurity, which requires the addition of as much as sixty percent by weight of a drying agent, and which cannot be pressed into stable tablet form; and the utilization for intravenous injections of a substantially concentrated sterile solution of protein hydrolysate. The maximum obtainable concentration of the latter solution is approximately fifteen grams of amino acids per one hundred cc. of solution at room temperature, thus making it necessary to inject approximately two hundred and thirty cc. of solution per day into an amino acid starved individual to satisfy a normal daily requirement of approximately thirty-five grams.

An object of the instant invention is to provide a process whereby the constituent amino acids, or the salts of these acids, may be collectively obtained as a crystalline mixture from a protein hydrolysate.

Another object of the invention is to provide a process whereby a stable, non-hygroscopic, crystalline mixture of amino acids, or the salts of these acids, may be economically obtained from a natural protein.

A further object of this invention is to collectively obtain a pure and stable mixture of each of the amino acids, or the salts of these acids, present in a natural protein.

And still a further object of this invention is to obtain from a natural protein a crystalline mixture of the amino acids, or the salts of these acids, which are essential to the nitrogen metabolism process of the human body.

These and other objects of the invention, which will be apparent from the following description, are obtained broadly by hydrolyzing a natural protein, or mixtures of natural proteins, obtaining a substantially concentrated solution of protein hydrolysate, adjusting the pH of the solution to a predetermined value, adding a calculated volume of a non-polar or slightly polar medium to the solution, separating the original amino acid solvent from the non-polar or slightly polar medium, and then separating the non-polar or slightly polar medium from the amino acids, or the salts of these acids.

The essentially saturated solution of protein hydrolysate, which is conventionally used as an end product, as heretofore described, may be obtained by acid, alkali, or enzymatic hydrolysis, each of these procedures being well known in the art. However, in order to illustrate all phases through which the amino acids, or the salts of these acids, progress from the natural protein stage to the crystalline mixture end product, a typical example of the acid hydrolysis procedure is herein set forth, it not being deemed necessary to set forth the alternative procedures of alkali and enzymatic hydrolysis, since each type of hydrolysis is productive of a substantially similar hydrolysate, and any minor differences are not essential to the practice of this invention.

Any of the natural proteins may be used for the hydrolysis, since the hydrolysate of each protein is similar in respect to the kinds of constituent amino acids, or the salts of these acids, present, the relative proportion of the constituent acids having no bearing on the process of the invention.

The acid hydrolysis of casein will serve as an example of the conventionally practiced portion of the process. Approximately two kilograms, for example, of casein, averaging about eighty percent by weight of protein, is slowly added to approximately ten liters of 5N sulphuric acid while the acid is stirred. The mixture is autoclaved at twenty pounds pressure for a period of about sixteen hours, or may be refluxed for about forty hours at a temperature within the range of 105–110° C. The solution is allowed to cool, and an excess of calcium hydroxide is added until the solution is alkaline to phenolphthalein. The solution is then made up to thirty liters by the addition of distilled water, allowed to stand for a sufficient period to allow the settling out of the calcium sulphate, and the clear liquid is decanted. The precipitate washings are added to the decanted liquid, and the solution is concentrated by vacuum distillation to approximately a ten liter volume to quantitatively remove the ammonia freed by the hydrolysis. The solution is saturated with carbon dioxide to precipitate a considerable portion of the excess calcium as calcium carbonate. Oxalic acid is then added to the solution to eliminate the last traces of calcium as calcium oxalate. The liquid is then heated, filtered, and barium hydroxide is added to the clear liquid to precipitate the last traces of sulphate present in the hydrolysate, the addition of the barium hydroxide being carefully controlled so that a filtered sample of the hydrolysate shows but a slight trace of sulphate, thus assuring that no barium is present.

In every type of hydrolysis of a protein, some of the amino acids are destroyed. In the sulphuric acid hydrolysis above described, tryptophane, one of the acids essential to the nitrogen metabolism process of the body, is destroyed together with cystine, a non-essential acid. These acids may be added to the solution in the amount of approximately one percent by weight of the total amino acids present. The solution is then concentrated to a volume of approximately three liters to provide a substantially saturated sterile solution of amino acids which, as above mentioned, is conventionally used for intravenous injections. The concentrated solution is also conventionally adjusted at this point to a pH of approximately 4—5 and the amino acids are precipitated in amorphous form as heretofore described.

The process of the instant invention deviates from the conventional practice in the treatment of the above described protein hydrolysate in the following manner. To either the volume of substantially concentrated solution above derived or to the volume of solution of the hydrolysate before concentration to substantial saturation, there is added from 1–5 volumes of a liquid having the following necessary physical properties: The liquid must be non-polar or slightly polar in nature; it must be miscible with the solvent of the amino acids or salts thereof; and it must have a higher boiling point than said solvent. A further necessary characteristic of the liquid is that it must be chemically inactive with respect to the amino acids or the salts thereof, but it is immaterial whether the amino acids, or the salts thereof, are soluble or insoluble in this non-polar or low polar solvent.

Among the non-polar or slightly polar media which may be used are the following: acetol, acetonyl acetone, acetyl piperidine, γ butylene glycol, carbitol, carbitol acetate, diacetone alcohol, diethylamine ethanol, ethyl lactate, glycol methyl ether, and glycol ethyl ether. These compounds are merely illustrative of a few of the media which may be used in the instant invention, it being understood that there are numerous other non-polar or slightly polar liquids which have a higher boiling point than the amino acids or salts solvent, and which are miscible with the generally aqueous solvent of the hydrolysate and chemically inactive with respect to the amino acids or salts. The electrical activity, or dielectric constant, of each of the non-polar or slightly polar media fulfilling the enumerated requirements should be sufficiently low so that the addition of the liquid within the volume range set forth to the hydrolysate will provide a resultant solution having a dielectric constant lower than water. In connection with the above cited liquids which are either non-polar or slightly polar in nature, it is to be understood that ethers and esters are generally classifiable among the group of non-polar solvents, while the alcohols are termed to be slightly polar liquids.

When the non-polar or slightly polar solvent is added to the protein hydrolysate in the ratio of from 1–5 volumes of the former to one volume of the latter, or a sufficient volume of the former to render the resulting solution substantially neutral electrically and to prevent too great a shift in the pH value of the total solution as the solution is concentrated, the mixture solution may be subjected to vacuum distillation, or otherwise treated, to completely remove the aqueous portion of the solution. At this point, the amino acids or the salts thereof will precipitate in crystalline form if they are not soluble in the particular non-polar or slightly polar solvent employed. The crystalline precipitate is then filtered from the non-polar or slightly polar solvent, washed with alcohol, ether or other appropriate medium, and vacuum dried to obtain the final product of the process, a completely crystalline, quantitative mixture of all of the amino acids, or the salts thereof, originally present in the natural protein used.

If the amino acids or salts have either a low or high solubility in the particular non-polar or slightly polar solvent used, the non-aqueous solution may be further subjected to vacuum distillation, or otherwise treated, to remove the non-polar or slightly polar solvent. The final crystalline precipitate is washed and vacuum dried.

It is desirable, though not essential, that the boiling point of the non-polar or slightly polar solvent used be sufficiently higher than the boiling point of water, preferably as much as 15–20° C., so as to enable a complete separation of the water and non-polar or slightly polar solvent in the distillation or fractionation process. The non-polar or slightly polar solvent may then be re-used subsequently without further treatment.

By way of specific example of the process of the invention, one of the numerous combinations of a protein hydrolysate and a non-polar or slightly polar solvent that may be used in the practice of the invention is the casein hydrolysate hereinabove mentioned and ethyl lactate. To three liters of casein hydrolysate at a pH of approximately 4–6 there is added approximately 4.5 liters of ethyl lactate, resulting in a solution of 7.5 liters having a pH of approximately 4.5–5. This solution is vacuum distilled at a pressure of 10 mm. and a temperature of 31–32° C. to remove all of the water present. The resulting solution is further distilled at a pressure of 5 mm. and a temperature of 48° C. to remove the ethyl lactate. The crystalline residue is then washed and vacuum dried.

In those cases where the amino acids salts, rather than the amino acids, are present in the hydrolysate, the low polar or non-polar medium is added to the hydrolysate when the latter is at a pH of 4–6.8.

The crystalline mixture of amino acids provides a yield of 60 to 80 percent by weight of the protein of the original casein, and the crystalline mixture consists of more than 90 percent by weight of amino acids.

A typical analysis of the content of the essential amino acids in casein based on the protein content of the casein, as indicated in Table IV, page 217 of "Chemistry of the Amino Acids and Proteins" by C. L. A. Schmidt (1938 edition), is as follows:

| Essential Amino Acids | Percent |
|---|---|
| Arginine | 3.8 |
| Histidine | 2.5 |
| Iso-leucine and Leucine | 9.7 |
| Lysine | 6.0 |
| Methionine | 3.4 |
| Phenylalanine | 3.9 |
| Valine | 7.9 |
| Threonine | 3.5 |
| Tryptophane | 2.2 |

Based on the assumption that each amino acid contains one molecule of water of hydrolyzation, the calculated nitrogen content of the amino acids of casein, which include the essential acids above listed together with the non-essential acids, not listed above, is 10.8%.

In comparison with the above data, a typical analysis of the essential amino acid content of the crystalline mixture of amino acids obtained by the process of the instant invention is as follows, the percentage figures being based on the protein content of the casein similar to the data hereinabove given:

| Essential Amino Acids | Percent |
|---|---|
| Arginine | 3.68 |
| Histidine | 1.08 |
| Iso-leusine | 7.95 |
| Leucine | 11.40 |
| Lysine | 6.30 |
| Methionine | 3.24 |
| Phenylalanine | 5.22 |
| Valine | 7.95 |
| Threonine | 4.40 |
| Tryptophane | Destroyed in hydrolysis. |

It is to be emphasized that the above listed acids are merely the essential amino acids obtained by the instant process, said acids, with the exception of arginine, lysine and histidine, being all classifiable as belonging to the neutral, or monoaminomonocarboxylic group of amino acids. Arginine, lysine and histidine are classifiable as belonging to the basic group of amino acids. The amino acids belonging to the acidic group, namely, aspartic and glutamic acids, are also obtained in crystalline form along with the essential acids above-listed, but, since the acidic group acids are not essential to the nitrogen metabolism process of the human body, they are not listed in the above table. Other amino acids, constituting the remainder of the nineteen acids obtainable from a natural protein, are also obtained simultaneously in crystalline form with the essential acids and the acidic group by the practice of the instant process, and these other acids are as follows: cystine, serine, tyrosine, alanine, glycine, proline and hydroxproline. It will thus be understood that the crystalline mixture of amino acids resulting from the process includes all of the member acids of each of the neutral, basic and acidic groups; in other words, all of the constituent amino acids obtainable from a natural protein, and each acid is quantitatively obtained in biologically pure form.

The total nitrogen content of the amino acids mixture on which the above analytical data was obtained was 11.52 percent.

A comparison of the total nitrogen content of the amino acids derived by conventional fractional separation of the constituent amino acids of a protein hydrolysate with the total nitrogen content of the amino acids derived from a protein hydrolysate by the instant process indicates that a more quantitative yield of the constituent acids is obtained concurrently by this process than is obtained by a series of separations in the conventional manner. Any nitrogen content of an amino acid mixture exceeding 10.8% is considered to be exceptional by those skilled in the field of protein chemistry, as being indicative of the high order of purity of the mixture analyzed, and as approximating as closely as possible a theoretical maximum in the degree of purity. Further proof that the yield of the constituent amino acids obtained from a protein hydrolysate by the process of the invention is quantitative may be derived from a comparison of the percentage figure denoting the alpha amino nitrogen content with the percentage figure denoting the total nitrogen content, the ratio of the former figure to the latter indicating the degree of completion of the hydrolysis. If the figure resulting from (alpha $N$/total $N \times 100$) approximates 80, then the hydrolysis has been complete and all of the polypeptides have been converted to amino acids. The range for alpha N obtained by analysis of the amino acids mixture resulting from a practice of the process of the invention has been found to be 9.5–10.1 percent, while the range for total N has been found to be 11.3–12.0 percent. The ratio of these ranges indicates that total hydrolysis is achieved by the process of the invention, and it is only under conditions of total hydrolysis that the purity of the amino acids end product is assured.

It is to be understood that the process of the invention is not limited to the use of the specific materials cited, such as casein, sulphuric acid, ethyl lactate, etc. The hydrolysate of any of the natural proteins may be treated with any nonpolar or slightly polar liquid which is miscible with the hydrolysate, has a higher boiling point than the solvent of the amino acids, or amino salts, and is chemically inactive with respect to the amino acids or salts. A quantitative crystalline precipitate of a single amino acid or amino salt in solution, or of any mixture of amino acids or amino salts can be obtained by the process above described, it not being necessary to apply the steps of the process specifically to a protein hydrolysate.

The scope of the invention is to be limited only by the appended claims.

What I claim as new and desire to secure by Letters Patent is:

1. A method for obtaining a crystalline mixture of amino acids or the salts thereof from an aqueous solution having as a solute said acids consisting of the essential steps of mixing with one volume of said solution approximately one and one-half volumes of an organic medium taken from the group having the properties of being miscible with the solution, having a higher boiling point than the solvent phase of said solution, having an electrostatic effect not in excess of that of a slightly polar liquid, and having no chemical affinity for the solute of the solution, separating the solvent phase of said first solution from the organic medium and solute, and separating the organic medium from the solute.

2. A method for obtaining a crystalline mixture of amino acids from a protein hydrolysate consisting of the essential steps of adding a predetermined volume of an organic medium having a higher boiling point than water to the hydrolysate, said organic medium being miscible with the hydrolysate, being chemically inactive with respect to the amino acids, and having an electrostatic effect not in excess of that of a slightly polar liquid, separating the water from the mixture, and separating said organic medium from the amino acids.

3. A method for quantitatively obtaining a crystalline mixture of all of the amino acids from a hydrolysate of a natural protein having a pH of 4–7 consisting of adding approximately one and one-half volumes of an organic medium having a higher boiling point than water to each volume of hydrolysate, said organic medium being miscible with the hydrolysate, chemically inactive to the amino acids, and having an electrostatic effect not in excess of that of a slightly polar liquid, distilling the water from the mixture, and separating the organic medium from the amino acids.

4. A method for quantitatively obtaining in crystalline form all of the amino acids present in a protein hydrolysate consisting of the essential steps of adding to one volume of the hydrolysate from one to five volumes of an organic medium having the following physical properties: A higher boiling point than water; miscibility with the hydrolysate; chemical inactivity with respect to the amino acids; and an electrostatic effect no greater than that of a slightly polar liquid, separating the water from the mixture, and separating the organic medium from the amino acids.

5. The method, as set forth in claim 4, wherein the dielectric constant of the organic medium is sufficiently low so that the solution resulting from the addition of the organic medium to the hydrolysate has a dielectric constant lower than that for water.

6. The method, as set forth in claim 5, wherein the water is distilled from the mixture, and the organic medium is distilled from the amino acids.

7. The method, as set forth in claim 4, wherein the dielectric constant of the organic medium is sufficiently low so that the solution resulting from the addition of the organic medium to the hydrolysate is substantially neutral electrically.

8. A method for quantitatively obtaining in crystalline form all of the amino acids present in a protein hydrolysate consisting of the steps of adding to one volume of the hydrolysate from one to five volumes of an organic medium having the following physical properties: A higher boiling point than water; miscibility with the hydrolysate; chemical inactivity with respect to the amino acids; and an electrostatic effect no greater than that of a slightly polar liquid; separating the water from the mixture, and separating the organic medium from the amino acids.

9. The method, as set forth in claim 8, wherein the dielectric constant of the organic medium is sufficiently low so that the solution resulting from the addition of the organic medium to the hydrolysate has a dielectric constant lower than that for water.

10. A method of obtaining a crystalline mixture of amino acids consisting of the following essential steps: providing an aqueous solution containing at least one of the monoaminomonocarboxylic acids and at least one of the amino acids belonging to one of the neutral and basic groups of amino acids; adding to one volume of said solution from one to five volumes of an organic medium having the following physical properties: a higher boiling point than water; miscibility with the solution; chemical inactivity with respect to the amino acids; and an electrostatic effect no greater than that of a slightly polar liquid; separating the water from the mixture; and separating the organic medium from the amino acids of said mixture to quantitatively obtain in crystalline form all of the acids contained in said first mentioned aqueous solution.

11. The method set forth in claim 10, wherein the organic medium is further characterized by an absence of solvent action on the amino acids.

12. A method for obtaining quantitatively in crystalline form all of the amino acids present in the hydrolysate of a natural protein consisting of the step of mixing with one volume of said hydrolysate from one to five volumes of an organic medium having the following properties: miscibility with the hydrolysate; a higher boiling point than water; an electrostatic effect not in excess of that of a slightly polar liquid; and no chemical affinity for the amino acids; and the further steps of first separating the water from the mixture and then separating the organic medium from the mixture.

13. The method set forth in claim 12, wherein the organic medium is further characterized by an absence of solvent action on the amino acids.

14. A method for obtaining a crystalline mixture of amino acids from a protein hydrolysate comprising adding a predetermined volume of ethyl lactate to said hydrolysate, separating the water from the ethyl lactate, and distilling off said ethyl lactate.

15. A method for obtaining in crystalline form the solute of a hydrolysate of a natural protein having a pH of 4–7 comprising adding to one volume of said hydrolysate from one to five volumes of ethyl lactate, and distilling the resultant mixture under a relatively high vacuum until a deposition of said solute has been obtained.

HENRY S. HESS.

REFERENCES CITED

The following references are of record in the file of this patent:

UNITED STATES PATENTS

| Number | Name | Date |
|---|---|---|
| 1,938,512 | Bromig | Dec. 5, 1933 |
| 1,990,769 | Barnett | Feb. 12, 1935 |
| 2,462,124 | Neuberg et al. | Feb. 22, 1949 |
| 2,471,053 | Almquist et al. | May 24, 1949 |

FOREIGN PATENTS

| Number | Country | Date |
|---|---|---|
| 527,485 | Great Britain | Oct. 9, 1940 |

OTHER REFERENCES

Schmidt: "Chem. Amino Acids and Proteins," p. 143, Thomas, Springfield, Ill. (1938).

Smyth: "Dielectric Constant and Molecular Structure," Monograph Series, p. 194 (1931).

Town: Biochem. J., vol. 22, pp. 1084–1085 (1928).